US008008903B2

(12) United States Patent
Park et al.

(10) Patent No.: US 8,008,903 B2
(45) Date of Patent: Aug. 30, 2011

(54) METHOD AND APPARATUS FOR REGULATING A DIODE CONDUCTION DUTY CYCLE

(75) Inventors: Chan Woong Park, Seoul (KR); Leif O. Lund, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 614 days.

(21) Appl. No.: 12/047,124

(22) Filed: Mar. 12, 2008
(Under 37 CFR 1.47)

(65) Prior Publication Data
US 2009/0033393 A1 Feb. 5, 2009

Related U.S. Application Data

(60) Provisional application No. 60/919,690, filed on Mar. 23, 2007.

(51) Int. Cl.
*G05F 1/575* (2006.01)
*H02M 3/335* (2006.01)
(52) U.S. Cl. ............... 323/288; 323/284; 363/21.16
(58) Field of Classification Search ............... 363/21.12, 363/21.13, 21.16, 21.17, 21.18, 97; 323/282, 323/284, 288
See application file for complete search history.

(56) References Cited

U.S. PATENT DOCUMENTS

| 5,694,305 | A | * | 12/1997 | King et al. | 363/21.11 |
| 7,463,497 | B2 | | 12/2008 | Negrete | |
| 7,471,531 | B2 | * | 12/2008 | Blaha et al. | 363/97 |
| 7,505,287 | B1 | * | 3/2009 | Kesterson | 363/21.01 |
| 2008/0192514 | A1 | | 8/2008 | Zhou et al. | |

FOREIGN PATENT DOCUMENTS

| JP | 2003-169469 | 6/2003 |
| JP | 2003-244953 | 8/2003 |
| KR | 10-2008-0039774 | 5/2008 |

* cited by examiner

*Primary Examiner* — Gary L Laxton
(74) *Attorney, Agent, or Firm* — Blakely Sokoloff; Taylor & Zafman LLP (57) ABSTRACT

An example power converter includes a clock signal generator coupled to generate a clock signal to control switching of a power switch to be coupled to the control circuit. Feedback circuitry is coupled to receive a feedback signal, which is representative of an output of a power converter during a feedback portion of an off time of the power switch. The feedback circuitry is coupled to respond to the feedback signal to control the clock signal generator to regulate a duty cycle of the feedback portion of the off time of the power switch as a proportion of a total power switch switching cycle period.

15 Claims, 8 Drawing Sheets

METHOD AND APPARATUS FOR REGULATING A DIODE CONDUCTION DUTY CYCLE

REFERENCE TO PRIOR APPLICATION(S)

This application claims the benefit of U.S. Provisional Application No. 60/919,690, filed Mar. 23, 2007, entitled "METHOD AND APPARATUS FOR REGULATING A DIODE CONDUCTION DUTY CYCLE."

BACKGROUND INFORMATION

1. Field of the Disclosure

The present invention relates generally to control circuits that regulate an output parameter of a switched mode power converter and, more specifically, the present invention relates to control circuits that regulate a duty cycle of a diode conduction time as a proportion of a switching cycle period.

2. Background

Power converter control circuits may be used for a multitude of purposes and applications. There is a demand for control circuit functionality that can reduce the number of components outside the control circuit. This reduction in external component count enables miniaturization of the power converter to improve portability, reduces the number of design cycles required to finalize a power converter design and also improves reliability of the end product. Furthermore, reduced component count can offer energy efficiency improvements in the operation of the power converter and can reduce the power converter cost. One aspect of the power converter offering the potential for component count reduction is in simplifying or removing the external circuitry previously required to achieve output current regulation in a power converter.

In isolated flyback converters used for AC/DC power conversion, the output current is typically measured across a sense element, typically a resistor, coupled to sense the current flowing in the power supply output terminals. This sensed current is used to generate a feedback signal that is coupled to a control circuit on a primary side of the power supply that is isolated from the output of the power supply, typically employing an opto-coupler.

In non-isolated power supplies such as buck-boost converters, boost converters, SEPIC converters or Cuk converters a feedback signal representative of the power converter output current is typically generated using a sense element such as a sense resistor to generate a signal representative of an output current flowing in the output terminals of the power supply.

In both isolated and non-isolated converter configurations, a power switch is coupled to a power supply input and to an energy transfer element such that a current flows from the power supply input through the power switch and the energy transfer element when the power switch is in an ON state. The control circuit is responsive to the feedback signal to control switching of the power switch to regulate power delivered from the input to the output of the power converter.

BRIEF DESCRIPTION OF THE DRAWINGS

Non-limiting and non-exhaustive embodiment and examples of the present invention are described with reference to the following figures, wherein like reference numerals refer to like parts throughout the various views unless otherwise specified.

DETAILED DESCRIPTION

Methods and apparatuses for implementing a control circuit for regulating a power converter output parameter are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. In addition, it is appreciated that the figures provided herewith are for explanation purposes to persons ordinarily skilled in the art and that the drawings are not necessarily drawn to scale.

A control circuit for regulating a power converter output parameter in accordance with the teachings of the present invention will now be described. Examples of the present invention involve methods and apparatuses to regulate a power converter output parameter or parameters.

Figure 1:
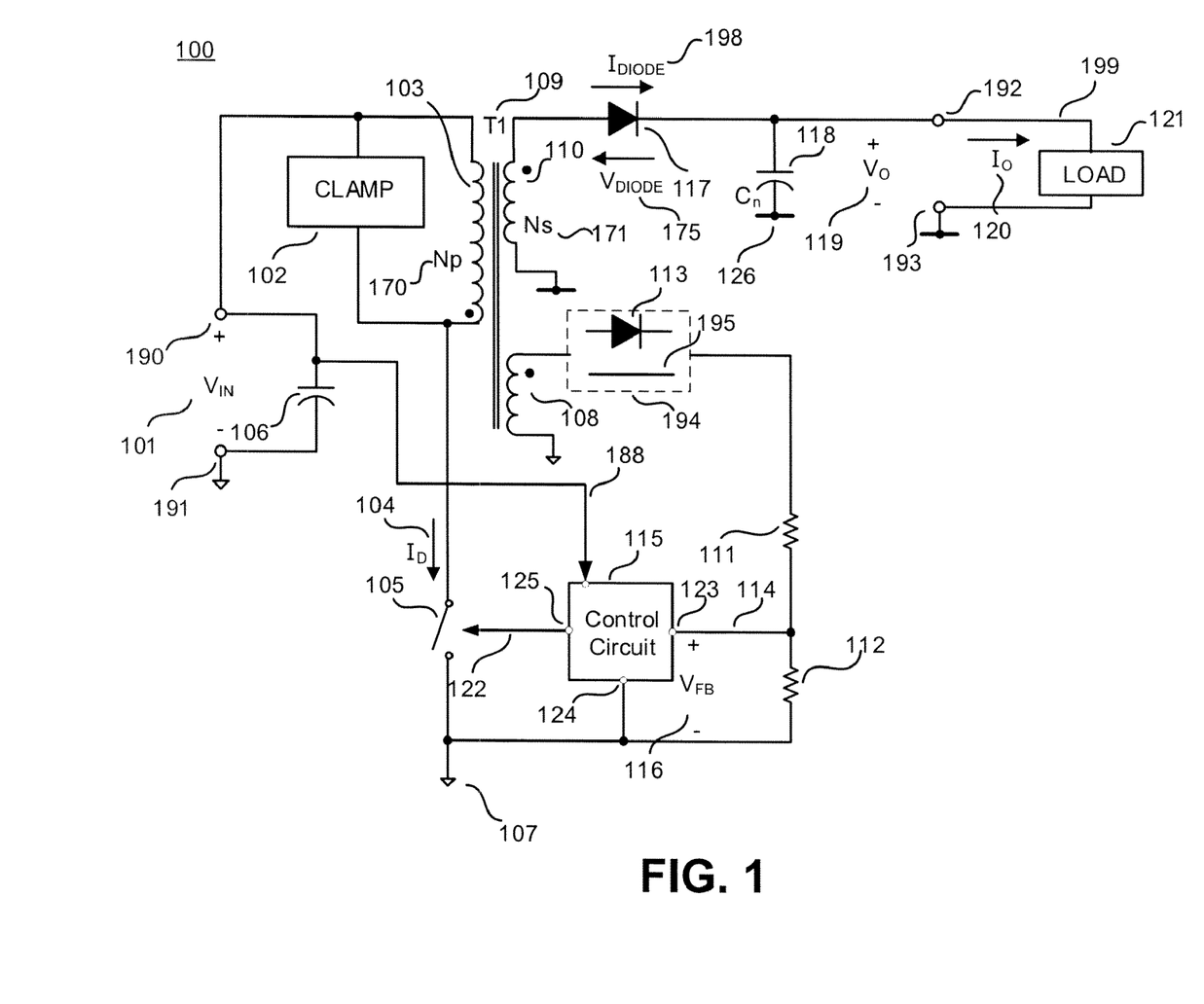
FIG. 1 is a schematic illustrating generally an example flyback power converter employing a control circuit responsive to a feedback signal, which may regulate a duty cycle of a diode conduction time as a proportion of a switching cycle period in accordance with the teachings of the present invention.

FIG. 1 shows generally a schematic of a power converter 100, also sometimes referred to as a power supply, employing a control circuit that regulates an output parameter of the power converter in accordance with the teachings of the present invention. In one example, power converter 100 is an isolated flyback converter where primary ground 107 and secondary return 126 are electrically isolated from one another. It is noted that in other examples power converter 100 could have more than one output in accordance with the teachings of the present invention.

As shown, a control circuit 115 is coupled to a power switch 105, which in one example is a metal oxide semiconductor field effect transistor (MOSFET), a bipolar transistor or the like. Power switch 105 is coupled to the input winding 103 of energy transfer element 109, which is coupled to a DC input voltage 101 and an output power diode 117. In one example, DC input voltage 101 is the output of a rectifier circuit coupled to a source of AC voltage not shown. Capacitor 106 is coupled to power converter input terminals 190 and 191 to provide a low impedance source for switching currents flowing through first and second input terminals 190 and 191, energy transfer element 109 winding 103 and power switch 105 when the power switch 105 is in an ON state. In one example, control circuit 115 and switch 105 could form part of an integrated circuit that could be manufactured as a hybrid or monolithic integrated circuit. Control circuit 115 is coupled to receive a feedback signal 114, which in one example is a voltage signal, but in other examples could also be a current signal, or other signal representative of the power converter output, while still benefiting from the teachings of the present invention.

In the example of FIG. 1, control circuit 115 is coupled to regulate power delivered from the first and second input terminals 190 and 191 of power converter 100 to the power converter output terminals 192 and 193 coupled to load 121. In one example, the specific power converter output parameter being regulated is the DC output current $I_o$ 120. Energy transfer element 109 includes input winding 103 and output winding 110 and an auxiliary winding 108. The feedback signal 114 is coupled to control circuit 115 from auxiliary winding 108 through the resistor divider formed by resistors 111 and 112.

In operation, control circuit 115 regulates the output of power supply 100 by switching power switch 105 in response to the feedback signal 114. When switch 105 is on, energy from the capacitor 106 is transferred into the input winding 103 of the energy transfer element 109. When the switch is off, the energy stored in the input winding 103 is transferred to the output winding 110. The energy from output winding 110 is transferred to the output of the power supply 100 with a current that flows through a forward biased output power diode 117 to capacitor 118 and the load 121 coupled to the output terminals 192 and 193. While current flows through the output power diode 117 during the off period of switch 105, the output voltage $V_o$ 119 across load 121 plus the forward voltage drop across output power diode 117 is substantially equal to the voltage across the output winding 110.

As will be discussed, this portion of the off time of the power switch when the voltage across the output winding 110 is representative of the output voltage $V_o$ 119 while current flows through the output diode will be referred to as a feedback portion $T_{FB}$ of the off time of the power switch 105. In some cases, the current may substantially stop flowing from output winding 110 through the output power diode 117 during the off period of power switch 105. In this case, the output power diode 117 becomes reversed biased and the voltage drop across output winding 110 is no longer representative of the output voltage $V_o$ 119. This portion of the off time of the power switch 105 when substantially no current flows through output power diode 117 may be referred to as the no feedback portion of the off time of the power switch 105.

The voltage across the output winding 110 is reflected to an auxiliary winding 108 of the energy transfer element based on the turns ratio. The voltage across the auxiliary winding 108 may therefore be employed during the feedback portion $T_{FB}$ of the off time of the power switch 105 to obtain a feedback signal 114 regarding the output of power supply 100, which is coupled to be received by the control circuit 115 to control switching of the power switch 105 to regulate the output of power supply 100.

In one example, circuit block 194 includes a diode 113 coupled to the auxiliary winding 108 as shown in FIG. 1. During the on time of power switch 105, auxiliary winding diode 113 is reverse biased and therefore prevents current flow in resistors 111 and 112. In another example, circuit block 194 includes a substantially short circuit connection 195 as shown while still benefiting from the teachings of the present invention.

In the example where circuit block 194 includes the substantially short circuit connection 195, a signal is applied to terminal 123 of control circuit 115 during the on time of the power switch 105. However, this signal is a feedforward signal that is not representative of the output of the power converter but instead is representative of the power supply input voltage appearing across capacitor 106. In one example control circuit 115 is coupled to be responsive to the feedforward signal 114 during an on time of the power switch 105. In another example, control circuit 115 is coupled to be responsive to a feedforward signal 188 derived directly by coupling to capacitor 106. Thus, in the example where circuit block 194 includes the substantially short circuit connection 195, signal 114 is still therefore only a feedback signal representative of the output voltage 119 of power converter 100 during the feedback portion $T_{FB}$ of the off time of power switch 105. In one example this feedback portion $T_{FB}$ of the off time of power switch 105 is the period during which current 198 flows in output power diode 117 as will now be described with reference to the example illustrated in FIG. 2.

Figure 2:
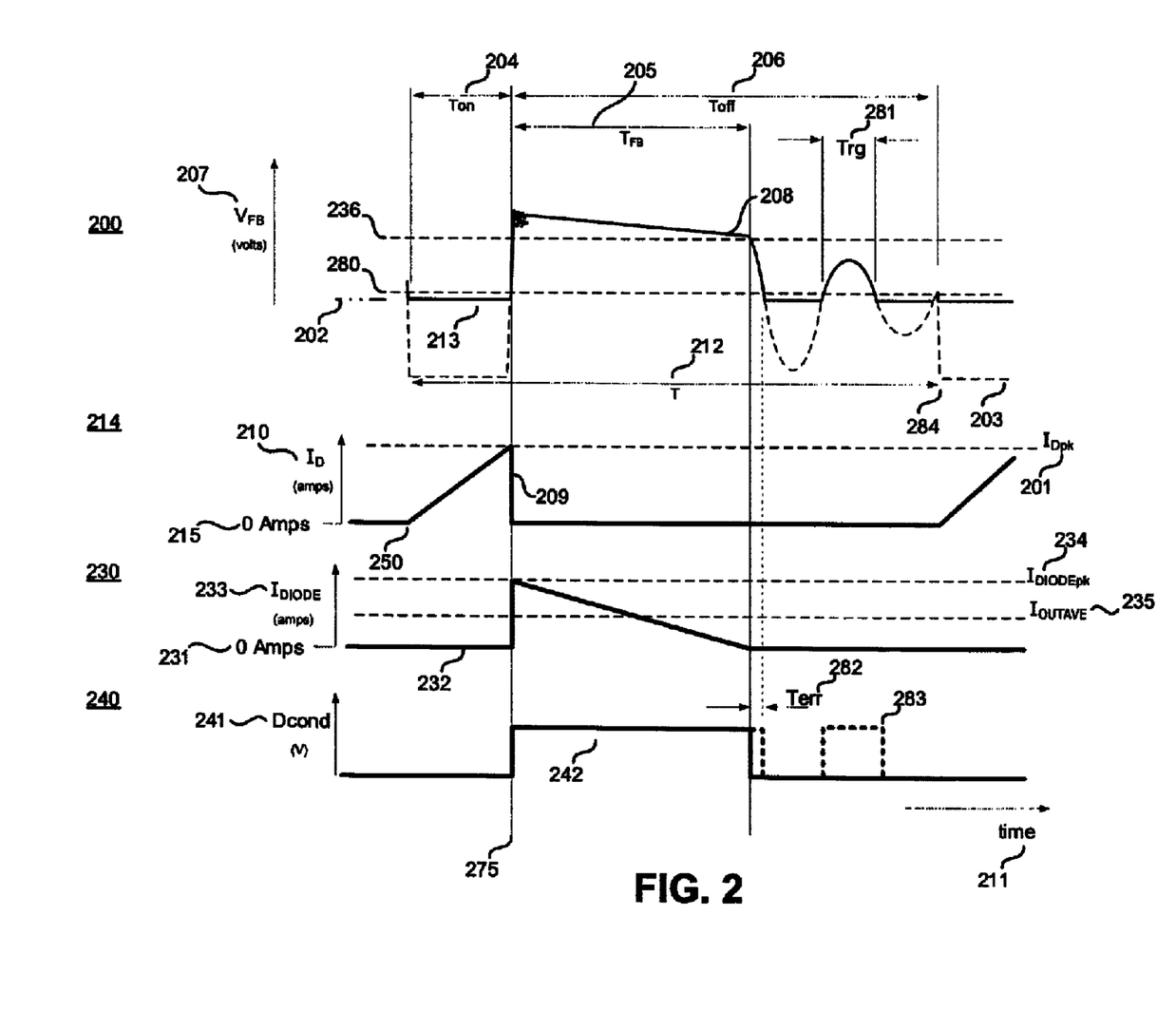
FIG. 2 shows generally waveforms for a power converter employing an example control circuit responsive to a feedback signal to regulate a duty cycle of a diode conduction time as a proportion of a switching cycle period in accordance with the teachings of the present invention.

FIG. 2 shows example waveforms that help illustrate generally the operation of the example circuit of FIG. 1. For instance, waveform 200 is a voltage waveform of $V_{FB}$ 116 in FIG. 1. Waveform 214 is a current waveform of the Drain current 104 flowing in power switch 105 in FIG. 1. Waveform 230 is a current waveform of the diode current 198 flowing in power diode 117 in FIG. 1. Waveform 240 is a feedback control signal waveform representative of whether a current is flowing through output power diode 117 in FIG. 1. In other words, waveform 240 in the illustrated example indicates whether output power diode 117 is conducting current while the power switch 105 is off. In the illustrated example, the waveforms 214 and 230 shown discontinuous current waveforms since the output power diode current 232 is substantially zero before the power switch 105 turns on at time 250. The Drain current waveform 209 therefore starts from substantially zero current 215 each time the power switch 105 turns on.

In each switching cycle, the power switch is on for an on time Ton 204 and is off for an off time Toff 206. During the feedback portion $T_{FB}$ 205 of the power switch off time, Toff 206, current 232 is flowing in the output power diode 117 of power converter 100 and the voltage appearing across output winding 110 is substantially equal to output voltage 119 plus the forward voltage drop of power diode 117. The feedback portion $T_{FB}$ 205 is often referred to as the reflected voltage period.

In the illustrated example, the current 198 that flows in output power diode 117 is substantially equal to a sum of a current flowing in the output capacitor 118 and output current $I_o$ 120 flowing in the load 121. Since the forward voltage of diode 117 is substantially known through manufacturers data, the voltage appearing across winding 110 is therefore representative of the output voltage 119. Furthermore, the voltage appearing across winding 108 is related to the voltage across winding 110 through the turns ratio of windings 110 and 108. For example, if windings 110 and 108 have the same number of turns, the voltage appearing across winding 110 and winding 108 during the feedback portion $T_{FB}$ 205 of the off time of the switch will, to a first order, be substantially equal. Second order influences such as leakage inductance and interwinding capacitance are not detailed here so as not to obscure the teachings of the present invention.

During the feedback portion $T_{FB}$ 205 of the off time of the switch, the voltage appearing across winding 108 is therefore also representative of output voltage 119. In one example, a waveform 240 is generated to produce a feedback control signal Dcond 241 by comparing feedback voltage signal 208 with a threshold voltage level 236 to generate a logic high in signal 242 when feedback voltage signal 208 is greater than threshold voltage level 236. The duration for which logic signal 242 is high is therefore substantially equal to the period $T_{FB}$ 205 when current flows through power output diode 117 in FIG. 1.

In another example a threshold voltage level 280 that is a lower value than threshold level 236 could be employed to generate Dcond feedback control signal 241. This lower threshold voltage level is less sensitive to the power supply output voltage magnitude and therefore the magnitude of feedback voltage signal 208. For example, in the power converter of FIG. 1, when the output voltage 119 is reduced at high output current conditions, the magnitude of feedback voltage signal 208 relative to ground potential 202 will also decrease. In the example where threshold voltage level 236 is used to generate Dcond feedback control signal 241, feedback voltage signal 208 can decrease in magnitude to a degree that the threshold voltage level 236 is always larger than feedback voltage signal 208, which would result in Dcond feedback control signal 241 remaining at a logic low level at all times, which would then no longer be an indication of the period for which current is flowing in output diode 117. Lower threshold level 280 eliminates this condition.

It is noted that in one example, the lower threshold voltage level 280 introduces two further considerations. In one example the first consideration is that the period of the Dcond signal is increased by a time period Terr 282. This Terr 282 introduces an error in Dcond 241 waveform since it no longer precisely represents the period for which current flows in output diode 117. In one example, therefore, the circuitry internal to control circuit 115 would need to compensate for this error.

In one example the second consideration is that the parasitic relaxation ringing waveform of feedback voltage signal 208 exceeds the lower threshold voltage level 280, for a period Trg 281, which can generate a false logic high 283 in Dcond feedback control signal 241 unless control circuit 115 comprises circuitry to eliminate this second logic high 283. Such circuitry could in one example include a latch that is set to hold Dcond 241 signal low from the end of period $T_{FB}$ 205 until the start of the next power switch switching cycle at time 284.

In another example, one or both of the above considerations can be avoided by designing control circuit 115 with a variable voltage threshold level to be compared to feedback voltage signal 208 to generate Dcond feedback control signal 241. In one example, the variable voltage threshold level can vary between voltage threshold levels 236 and 280 depending on the magnitude of feedback voltage signal 208. In one example this variable voltage threshold level is achieved by sampling the magnitude of feedback signal 208 at some fixed time during the $T_{FB}$ 205 period following the turn off of the power switch at time 275 and subtracting a fixed amount from the sampled magnitude. In one example, the fixed amount is a voltage substantially equal to 0.5 Volts.

Since feedback signal 114, which in this example is $V_{FB}$ 116, is related to the voltage appearing across winding 108 through the known circuit block 194 and resistor divider formed by resistors 111 and 112, the feedback signal 114 is representative of an output voltage of the power supply during the feedback portion $T_{FB}$ 205 of the power switch off time Toff 206.

It is noted that during the power switch 105 on time period Ton 204, the voltage appearing at feedback terminal 123 in FIG. 1 is substantially zero volts relative to ground terminal 124 if circuit block 194 includes a diode 113 or if there is an internal clamp (not shown) coupled to terminal 123. This case is shown by voltage level 213 in FIG. 2, which is substantially equal to the ground voltage 202.

In an example circuit configuration where the control circuit 115 in FIG. 1 does not have an internal clamp coupled to terminal 123 and when the circuit block 194 includes the substantially short circuit connection 195, the voltage appearing at feedback terminal 123 could follow a characteristic of the type shown by dashed line 203 in FIG. 2. In either case, the feedback voltage signal 208 in the illustrated example is representative of an output voltage 119 of the power converter 100 during the feedback portion $T_{FB}$ 205 of the power switch off time, which is substantially equal to the time period where the current $I_{DIODE}$ 198 and 233 is flowing through output power diode 117.

From the waveforms of FIG. 2, it is appreciated that the average output current level $I_{OUTAVE}$ 235 flowing in the output terminals 192 and 193 in FIG. 1 for example, may be calculated from the $I_{DIODE}$ 233 waveform according to the following relationship:

$$I_{OUTAVE} = \frac{I_{DIODEpk}}{2} \times \frac{T_{FB}}{T} \quad (1)$$

where $T_{FB}/T$ is a term representing a duty cycle of the feedback portion $T_{FB}$ of the power switch off time as a proportion of the total power switch switching cycle period T. Since $I_{DIODEpk}$ is related to $I_{Dpk}$ through the known input winding to output winding turns ratio Np/Ns of Np 170 and Ns 171 in the energy transfer element 109, $I_{OUTAVE}$ can be calculated from the peak value of $I_D$ 210, $I_{Dpk}$ 201 as $$I_{OUTAVE} = \frac{I_{Dpk}}{2} \times \frac{Np}{Ns} \times \frac{T_{FB}}{T} \quad (2)$$

Since the ratio Np/Ns is fixed, it can be seen that if $I_{Dpk}$ in equation (2) is substantially fixed, the average output current of power supply $I_{OUTAVE}$ 235 can be regulated by regulating a duty cycle of $T_{FB}$ 205 as a proportion of the power switch switching cycle period T 212. In other words $I_{OUTAVE}$ 235 can be regulated by regulating a duty cycle of the output power diode conduction time as a proportion of the power switch switching cycle period 212.

Figure 5:
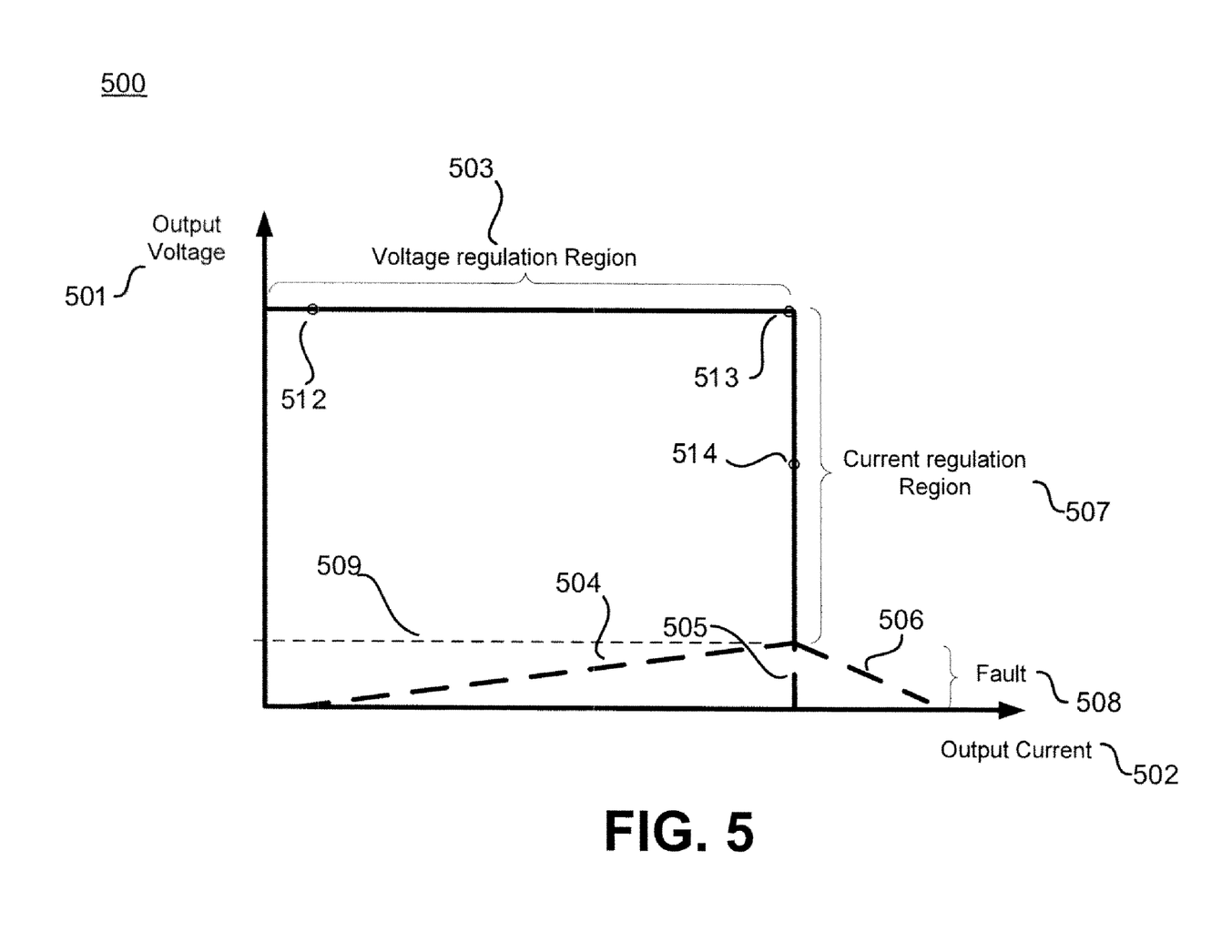
FIG. 5 is a graph of the output voltage versus output current characteristic curve of an example power converter employing an example control circuit in accordance with the teachings of the present invention.

The $T_{FB}$ period 205 is governed by the following equation $$T_{FB} = \frac{L \times I_{Dpk}}{(V_O + V_{DIODE})} \quad (3)$$

where in one example, L is the inductance of energy transfer element output winding 110 in FIG. 1, measured with all other energy transfer element windings uncoupled from external circuitry, Vo is output voltage 119 in FIG. 1 and $V_{DIODE}$ is the forward voltage drop of output diode 117 in FIG. 1 while current $I_{DIODE}$ 198 is flowing. Since $V_{DIODE}$ and L in equation (3) are substantially fixed in a given power converter, for a fixed value of $I_{Dpk}$ therefore it will be noted that $T_{FB}$ will increase if output voltage Vo reduces. This condition relates to a current regulation operating region of the power converter where the output voltage 119 drops as the load 121 impedance is decreased. This region of operation is discussed later in more detail with reference to FIG. 5.

Figure 3A:
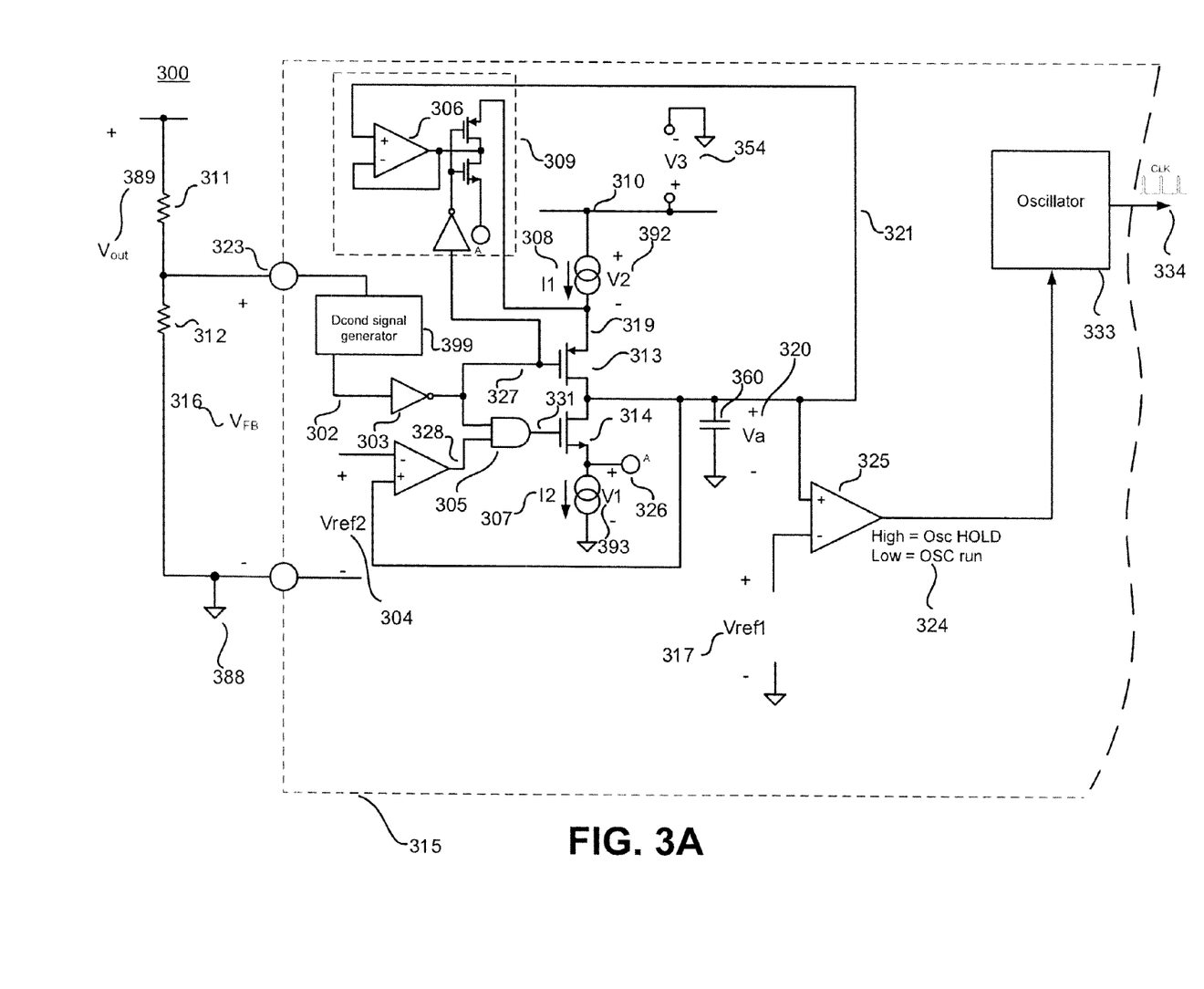
FIG. 3A is a more detailed schematic illustrating a portion of an example control circuit in accordance with the teachings of the present invention.

FIG. 3A shows an example schematic of a circuit 300 that in one example could form a portion of the internal circuitry of control circuit 315, which in one example could be control circuit 115 in FIG. 1 in accordance with the teachings of the present invention. The circuitry illustrated in FIG. 3A is one example of a circuit that, when coupled to receive a feedback signal that is representative of an output voltage of a power converter during the feedback portion $T_{FB}$ of the power switch off time, which in one example is substantially equivalent to the time period during which current flows through output power diode 117, could regulate power delivery from an input of a power converter to an output of the power converter by regulating a duty cycle of the feedback portion $T_{FB}$ of the power switch off time as a proportion of the total power switch switching cycle period in accordance with the teachings of the present invention.

As shown in the depicted example, control circuit 315 is coupled to receive a feedback signal $V_{FB}$ 316 at feedback terminal 323. In one example, control circuit 315 includes feedback circuitry, which includes at least Dcond signal generator block 399, switches 313, 314, feedback capacitor 360 and current sources 307 and 308. Feedback signal $V_{FB}$ 316 is applied to Dcond signal generator circuit block 399. It is appreciated that in other examples, Dcond signal generator block 399 could be configured to receive a feedback current signal where the need for external resistor 312 would be removed and the feedback signal would include a current flowing through resistor 311 into feedback terminal 323. The Dcond feedback control signal 302 output of circuit block 399 in one example is equivalent to Dcond feedback control signal 241 in FIG. 2. In order to generate Dcond feedback control signal 302, Dcond generator circuit block 399 may use one or more of the techniques discussed above with reference to FIG. 2.

In one example Dcond feedback control signal 302 is inverted with inverter 303 and then coupled to the gate of switch 313 and one input of AND gate 305. The output of AND gate 305 is coupled to the gate of switch 314. The purpose of AND gate 305 is explained further below with reference to FIG. 4, however for the purposes of the immediate description, signal 328 is assumed to be high and therefore the signal 331 applied to the gate of switch 314 is equivalent to the signal 327 applied to the gate of switch 313 since signal 328 is assumed to be high for this immediate description. Feedback capacitor 360 is charged at a rate determined by current source 308 when signal 327 is low and switch 313 is therefore in an on state. Feedback capacitor 360 is discharged at a rate determined by current source 307 when signal 327 is high and switch 314 is therefore in an on state.

The average value of voltage Va 360 across feedback capacitor 360 is therefore determined by the duty cycle of the Dcond feedback control signal 302. When voltage Va 360 reaches a threshold value Vref1 317, output signal 324 of comparator 325 goes high. In one example when output signal 324 is high, oscillator circuit 333 is coupled to delay the next clock signal 334 high pulse for the period that the comparator output signal stays high. In one example, an oscillator clock signal 334 high pulse initiates the start of the power switch 105 switching cycle on time period. As will be discussed, in one example, comparator 325 and oscillator 333 are included as part of a clock signal generator circuit in control circuit 315 to control switching of the power switch to regulate an output of the power converter in accordance with the teachings of the present invention.

Figure 4:
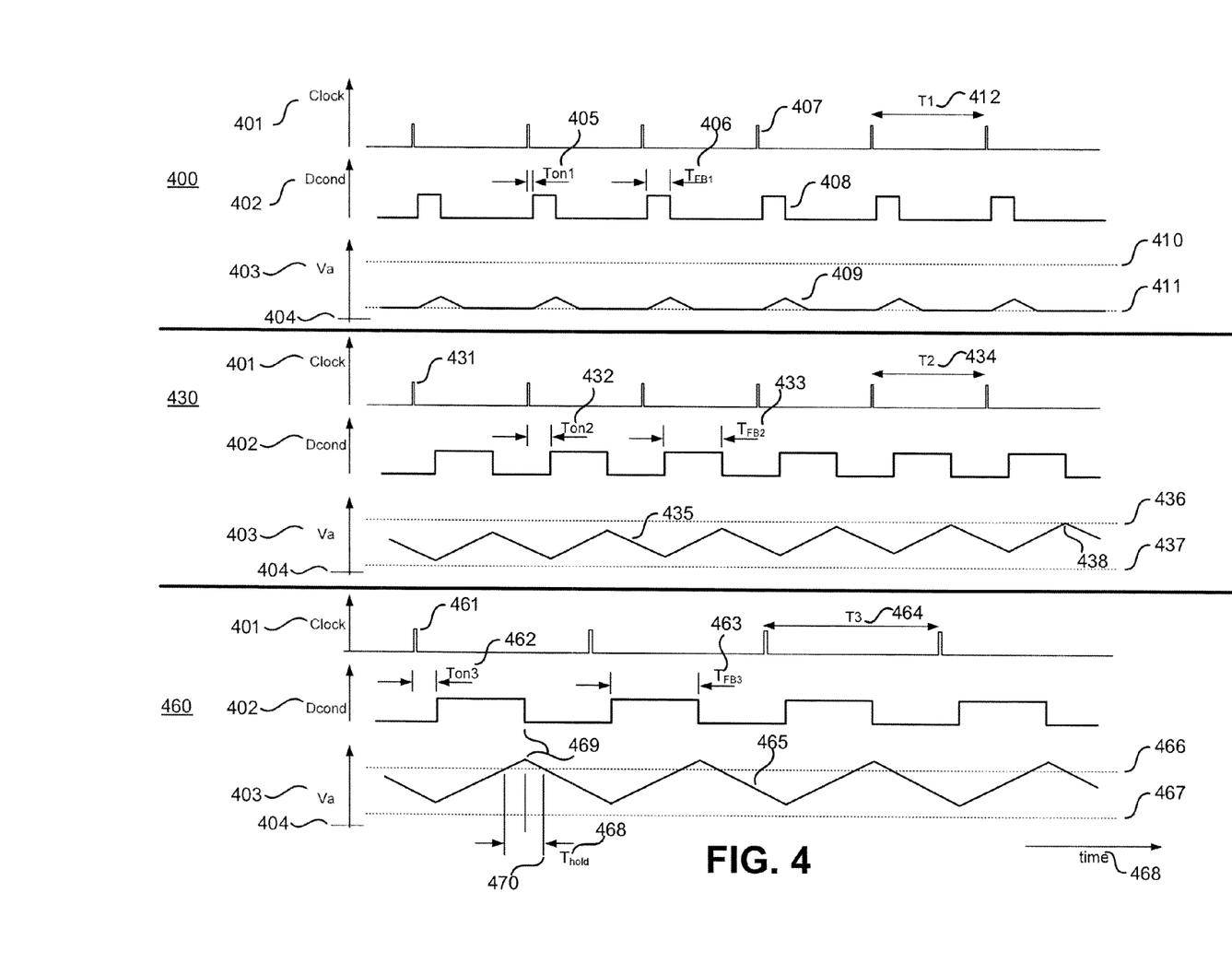
FIG. 4 shows generally waveforms for an example control circuit responsive to a feedback signal to regulate a duty cycle of a diode conduction time as a proportion of a switching cycle period in accordance with the teachings of the present invention.

The detailed operation of the circuit in FIG. 3A is described below with reference to the waveforms of FIG. 4 and the example power supply output voltage versus output current characteristic curve of FIG. 5. FIG. 4 shows three sets of waveforms 400, 430 and 460 representing three output load conditions of a power converter, which in one example could be the power converter 100 in FIG. 1. Waveform set 400 is for a low load condition, such as for example a load point 512 in FIG. 5. Waveform set 430 is for an output load condition where the power supply is close to a transition point from a voltage regulation region 503 to a current regulation region 507, such as for example load point 513 in FIG. 5. Waveform set 460 is for an output load condition where the power supply is operating in the current regulation region, such as for example load point 514 in FIG. 5. It is noted that the curve of FIG. 5 is idealized and though operating regions 503 and 507 are regions in which the voltage and current are regulated, this does not imply that they are constant but could vary depending on the output voltage and current conditions. Each set of waveforms 400, 430 and 460 includes 3 waveforms showing Clock signal waveform 401, which in one example is equivalent to signal 334 in FIG. 3A, Dcond feedback control signal waveform 402 which in one example is equivalent to signal 302 in FIG. 3A and Va waveform 403, which in one example is equivalent to Va 320 in FIG. 3A.

The light load condition illustrated by waveforms 400 includes an oscillator clock signal waveform 407 with switching cycle period T1 412. In one example, the clock signal 407 is generated by an oscillator and used in a control circuit such as control circuit 115 in FIG. 1 to initiate a turn on period of a power switch such as power switch 105 in FIG. 1. The waveforms 400 also show a power switch on time Ton1 405 being the time period between a start of a clock signal 407 pulse and a Dcond waveform 408 transition from a logic low to a logic high. In the example Dcond signal 408 is a logic high level for a duration $T_{FB1}$ 406. During period $T_{FB1}$, feedback capacitor 360 in FIG. 3A is charged at a fixed rate and Va 403 increases to a maximum value at the end of the $T_{FB1}$ period. When Dcond feedback control signal 408 goes low, feedback capacitor 360 is discharged to a lower voltage level 411. With reference to FIG. 3A, this lower voltage level is reference voltage Vref2 304. When the voltage Va 320 falls below reference voltage level Vref2 304, signal 328 goes low which in turn sets AND gate output signal 331 low, preventing any further discharge of feedback capacitor 360. In one example this lower clamp limit in the Va voltage is set at 1.25V to improve the transient response of the control circuit 315 by limiting the maximum change in Va 320 necessary to set the output of comparator 325 high as will be described below.

In example waveforms 430, clock signal 431 switching cycle period T2 434 is substantially equal to T1 412 while Ton2 432 is greater than Ton1 405. Since the power switch on time is longer for a substantially equal switching period cycle time, the power switch duty cycle has increased compared to the waveforms 400 and the waveforms 430 therefore illustrate an increased output current load condition compared to waveforms 400. It is noted that the control circuitry used to regulate this increase in power switch duty cycle with increasing load could employ common power supply control techniques such as voltage mode or current mode control. In other examples it is appreciated that variable frequency control schemes could be employed to increase power switch duty cycle with increasing load, although in these cases, power switch switching period cycle time T2 would be different from period 412 in waveforms 400. Regardless of the control scheme used, the power switch on time as a proportion of the switching cycle period, often referred to as the power switch duty cycle, is higher in waveforms 430 compared to waveforms 400.

The specific load condition shown in waveforms 430 is such that Dcond feedback control signal 402 duty cycle $T_{FB2}$/T2 is slightly greater than 50%. In an example where current sources 308 and 307 in FIG. 3A are substantially equal, the load condition of waveforms 430 therefore leads to the average voltage Va 403 rising since each switching cycle period since feedback capacitor 360 is charged for longer than it is discharged. At time point 438, the voltage Va 403 reaches upper threshold voltage level 436 which in one example is equivalent to Vref1 317 in FIG. 3A. At point 438, the signal 324 will go high and initiate an oscillator hold condition for the period for which Va signal waveform 435 is greater than threshold voltage 436.

The waveforms 460 show a load condition where the Dcond logic high period $T_{FB3}$ 463 is larger than $T_{FB2}$. An example load condition that could lead to this increase in the feedback portion $T_{FB}$ of the power switch off time is when the power supply is operating in a current regulation region such as 507 in FIG. 5. Equation (3) was earlier used to illustrate the fact that $T_{FB}$ is a function of output voltage such that $T_{FB}$ will increase with decreasing power supply output voltage.

The increase in $T_{FB}$ illustrated in waveforms 460 results in feedback capacitor 360 in FIG. 3A being charged for a longer time period allowing the voltage Va 320 to exceed threshold voltage level 466, which in one example is substantially equal to 1.75 Volts. At time point 469 in waveforms 460, Dcond feedback control signal 402 goes low and feedback capacitor 360 starts to be discharged. At time point 470 voltage Va 465 drops below threshold voltage level 466. The time period for which Va signal 465 is above threshold voltage level 466 is shown as $T_{hold}$ 468. In one example, for the period $T_{hold}$ 468, the output of comparator 325 in FIG. 3A is high and the control circuit oscillator 333 is held, delaying the next clock signal 334 high pulse and therefore delaying the start of the next power switch 105 switching cycle period. Signal 334 is therefore used to control switching of the power switch.

In the example of FIG. 4 therefore, as $T_{FB2}$ 433 reaches a threshold value of 50% of switching cycle period T2 434, the average voltage across feedback capacitor 360 in FIG. 3A increases as shown in waveforms 430. When the maximum value of Va 403 reaches threshold voltage level 466, the oscillator clock signal 431 is delayed. When $T_{FB}$ reaches a value $T_{FB3}$ the oscillator clock signal 461 is delayed by an amount $T_{hold}$ 468. Since for period $T_{hold}$ 468, Dcond feedback control signal 402 is high for substantially 50% of the time and low for substantially 50% of the time, the duty cycle of $T_{FB3}$ 463 as a proportion of the overall switching cycle period T3 464 remains substantially constant. It is appreciated that in other examples, the current values of current sources 307 and 308 in FIG. 3A could be different such that a $T_{FB}$ time period 205 as a proportion of a switching cycle period 206 would be regulated at a value other than 50%. Regardless of the relative values of current sources 307 and 308 therefore it is appreciated that the control circuit 315 is coupled to regulate the duty cycle of the feedback portion $T_{FB}$ of the power switch off time as a proportion of the total power switch switching cycle period when the duty cycle reaches a threshold value. It is noted that in the above description the oscillator 333 period is responsive to the voltage across capacitor 360.

Since $T_{FB3}$ 463 is representative of a period when current flows through the power diode 117 in FIG. 1, the waveforms of FIG. 4 therefore illustrate that the control circuit 315 controls switching of the power switch to regulate a duty cycle of the period when current flows through the output power diode as a proportion of the total switching cycle period. With reference to equation (2) it can be seen that if $I_{Dpk}$ is substantially fixed, the average output current of power supply can be regulated by regulating the duty cycle of the period when current flows through the power diode as a proportion of the total switching cycle period.

In one example, the control circuit 315 further comprises a voltage stabilization circuit 309 coupled to maintain a first voltage V1 393 across the first current source 307 during an off time of the first switch 314 substantially equal to the voltage appearing across the feedback capacitor 360.

The voltage stabilization circuit 309 is further coupled to maintain a second voltage V2 392 across the second current source 308 during an off time of the second switch 313 substantially equal to a difference between a control circuit supply voltage 354 and the voltage appearing across the feedback capacitor 360.

In the example, voltage stabilization circuit block 309 is used to help improve the accuracy of circuit 315. Without the voltage stabilization circuit 309, the voltage across current sources 307 and 308 may change significantly when the switches 313 and 314 turn on and off. This introduces an initial error in charge and discharge currents of practical current source circuits when the switches 313 and 314 again turn on during the next power switch switching cycle. These initial current errors reduce the accuracy with which charging and discharging currents flowing in feedback capacitor 360 are established, which reduces the accuracy with which the power converter output current is regulated.

In order to maintain the voltage drop substantially constant, whether switches 313 and 314 are on or off, voltage stabilization circuit 309 establishes a voltage at node 319 when switch 313 is off, that is substantially equal to the voltage at node 319 when switch 313 is on. Similarly circuit 309 establishes a voltage at node 326 when switch 314 is off, that is substantially equal to the voltage at node 326 when switch 314 is on. This performance is provided by the unity gain amplifier 306, the output of which is held at the voltage across feedback capacitor 360 through connection 321. The output of unity gain amplifier 306 is coupled to node 326 when signal 327 is low and is coupled to node 319 when signal 327 is high. In this way, current sources 313 and 314 establish their regulated current value flowing in capacitor 360 substantially immediately when switches 313 and 314 provide a current path for current to flow in capacitor 360.

Figure 3B:
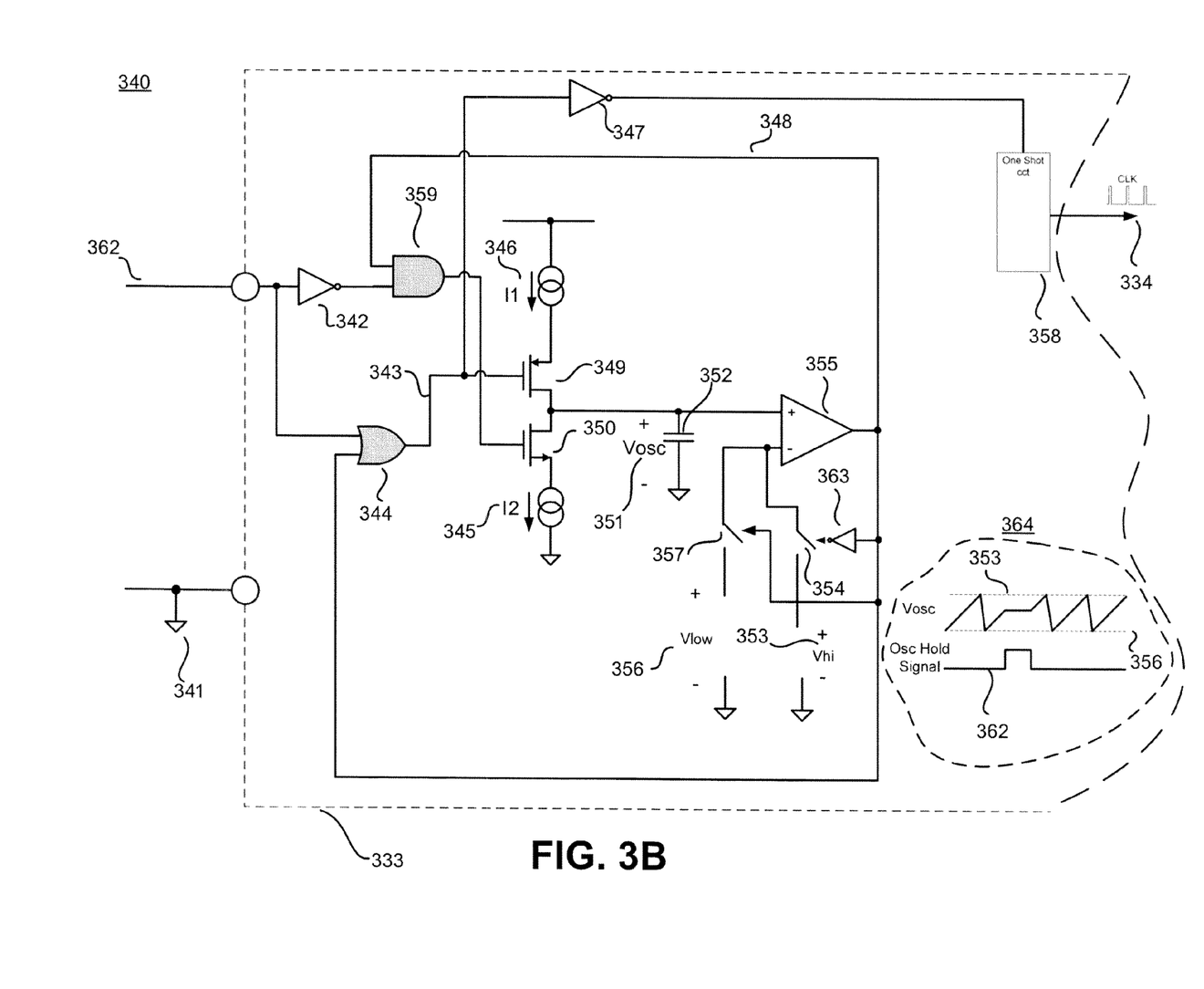
FIG. 3B is a schematic illustrating of a portion of an oscillator circuit in accordance with the teachings of the present invention.

FIG. 3B shows a portion of one example of an oscillator circuit such as oscillator 333 in FIG. 3A. Oscillator 333 in FIG. 3B is coupled to receive an oscillator hold signal 362, which in one example could be signal 324 in FIG. 3A. All voltages referred to in the following description are with reference to ground potential 341 in FIG. 3B. The basic operation of oscillator circuit 333 is as follows. When comparator 355 output signal 348 is high, switch 357 is closed and Vlow 356 voltage is applied to non-inverting input to comparator 355. Assuming for the moment that signal 362 is low, to allow the oscillator to run, the output of inverter 342 is high and the output of AND gate 359 is also high and transistor switch 350 is therefore on. Capacitor 352 is therefore discharged at a rate determined by the value of current source 345. Since signal 348 is high, the output of OR gate 344 is high and transistor switch 349 is therefore off. When the voltage across capacitor 352, Vosc 351 has discharged to the threshold value of Vlow 356, the output of comparator 355 goes low, switch 357 is turned off, switch 354 is turned on due to the inverter 363 output going high and the Vhi voltage 353 is applied to the non-inverting input of comparator 355. Since comparator output 348 is low, the output of AND gate 359 is low and transistor switch 350 is turned off. If oscillator hold signal 362 is still low, then the output of OR gate 344 goes low, turning on transistor switch 349. Capacitor 352 is then charged at a rate determined by current source 346. In one example current source 346 has a lower current value than current source 345. When the voltage Vosc 351 reaches the Vhi threshold 353, the output of comparator 355 again goes high and the cycle repeats. Gates 342, 359 and 344 however are coupled such that when oscillator hold signal 362 goes high, the capacitor 352 voltage Vosc 351 is held substantially constant for the duration of the period that signal 362 is high. This is true regardless of whether the capacitor 352 is being charged or discharged at the time. One example of this functionality is illustrated with the waveforms 364 showing that the Vosc voltage 351 is held constant during the period that the Osc hold signal 362 is high.

The oscillator output clock signal 334 in one example can be generated by inverting the output signal 343 of gate 344 using inverter 347 and applying it to the input of a one shot circuit 358 such that clock signal 334 is generated. It is appreciated that there are many ways in which the above oscillator functionality could be realized and the example shown in FIG. 3B is used simply by way of example.

FIG. 5 also illustrates examples of how the power supply output voltage 501 and output current 502 can deviate from the ideal current regulation characteristic when output voltage 501 is low. In one example operation below an output voltage level 509 is regarded as a fault condition as indicated by region 508. In one example where the power converter is being used in a battery charger application, operation at output voltages below 509 could indicate a dead battery or the like. In one example it is desirable to follow a foldback characteristic as illustrated by characteristic 504. In another example, a straight characteristic 505 is desirable and in yet another example, a characteristic 506 where the output current 502 increases at voltages below voltage 509 may be acceptable.

Figure 6:
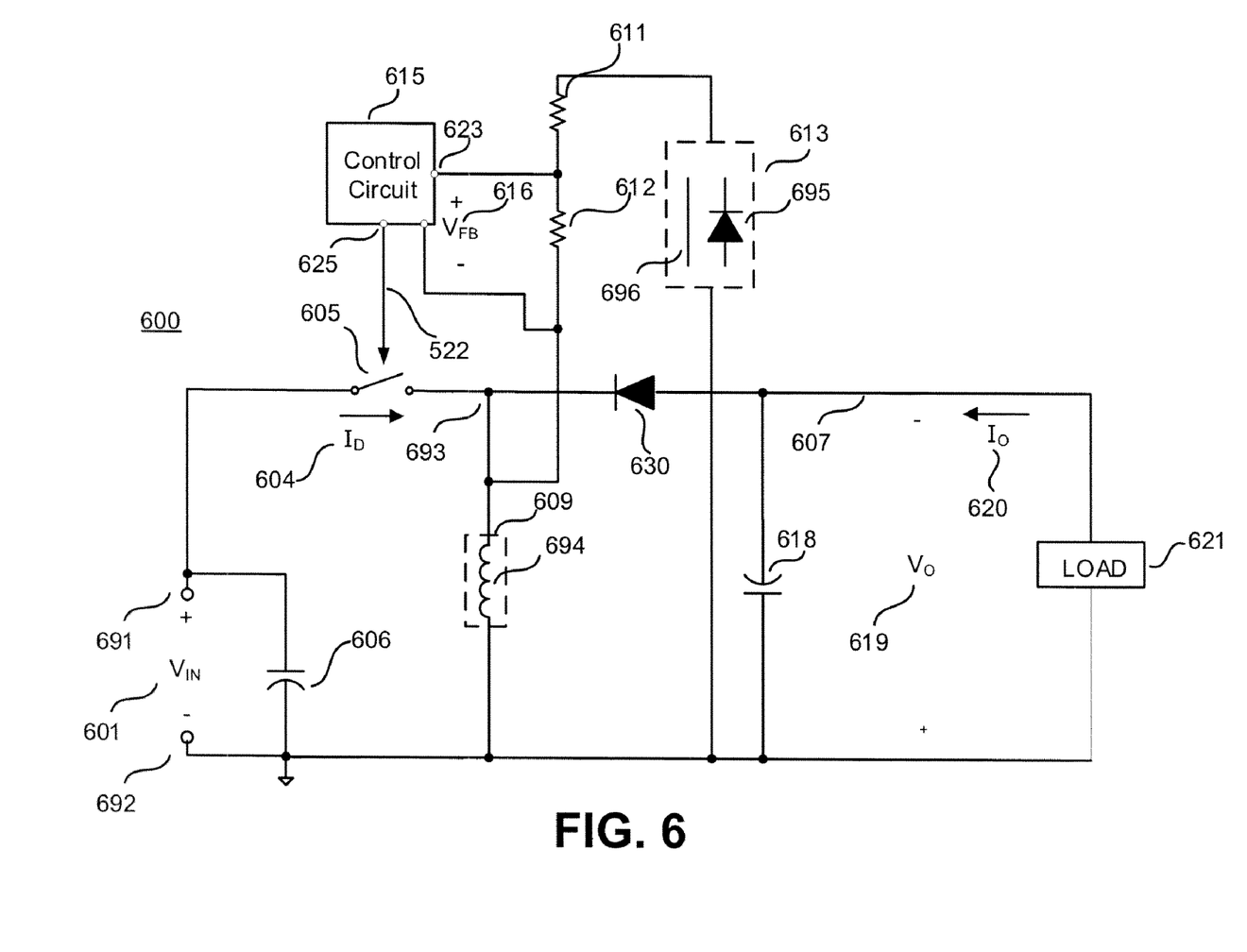
FIG. 6 is a schematic illustrating generally an example non-isolated power converter employing an example control circuit in accordance with the teachings of the present invention.

FIG. 6 shows a schematic 600 of an example non-isolated power converter in accordance with the teachings of the present invention. In the illustrated example, the example non-isolated power converter shown is a buck-boost converter. It is appreciated that other types of non-isolated power supplies may also benefit from the teachings of the present invention, including for example, but not limited to boost converters, SEPIC converters, Cuk converters or the like. In the illustrated example, control circuit 615 shares many aspects of its operation with the control circuits 115 and 315 described above. In one example, there is no requirement for an auxiliary winding on the energy transfer element and instead a feedback signal having a voltage value $V_{FB}$ 616 is coupled to the control circuit 615 from the main energy transfer element 609 winding 694.

In operation, when power switch 605 is in an ON state, current 604 flows between first 691 and second 692 input terminals of the power supply 600 through the energy transfer element 609 and the power switch 605. When power switch 605 turns off, during a feedback portion $T_{FB}$ of the power switch off time, the voltage at node 693 drops to a value substantially equal to the voltage of output ground rail voltage 607 minus the forward voltage drop across output power diode 630, which is coupled to energy transfer element 609, to sustain current flow in energy transfer element 609. During this feedback portion $T_{FB}$ of the power switch 605 off time, when output power diode 630 is conducting current, the voltage across energy transfer element 609 is therefore equal to output voltage 619 plus a forward diode voltage drop across diode 630 and is therefore representative of the output voltage 619 during this feedback portion $T_{FB}$ of the power switch 605 off time. The current that flows in output power diode 630, is substantially equal to a sum of a current flowing in the output capacitor 618 and output current 620 flowing in the load 621. As shown in the example, the voltage across energy transfer element winding 694 is coupled through circuit block 613 and resistor divider formed by resistors 611 and 612 to feedback terminal 623 of control circuit 615 as a feedback signal having a voltage value $V_{FB}$ 616.

In the illustrated example, the feedback signal voltage value $V_{FB}$ 616 is coupled to control circuit 615 from energy transfer element 609 winding 694 only during the off time of power switch 605. In one example, circuit block 613 includes a diode 695 coupled to the main energy transfer element winding 694. During the on time of power switch 605, diode 695 is reverse biased and therefore prevents current flow in resistors 611 and 612.

In another example, circuit block 695 includes a substantially short circuit connection 696 as shown while still benefiting from the teachings of the present invention. In this example where circuit block 695 includes the substantially short circuit connection 696, a signal is applied to terminal 623 of control circuit 615 during the on time of the power switch 605. However this signal during the on time of the power switch 605 is not representative of the output voltage of the power converter. In an example where circuit block 613 comprises the substantially short circuit connection 696, the feedback signal having a voltage value $V_{FB}$ 616 is still therefore only a feedback signal representative of the output voltage 619 of power converter 600 during the feedback portion $T_{FB}$ of the power switch 605 off time, which is while there is current flowing in diode 630 in accordance with the teachings of the present invention. In one example of the non-isolated buck-boost converter circuit of FIG. 6, circuit block 613 is likely to include a diode 695 to help ensure that feedback signal 614 is an accurate representation of output voltage 619 since the forward voltage drop across diode 695 tends to cancel the forward voltage drop across diode 630.

Thus, in one example, the principle of operation of control circuit 615 is similar to that of control circuits 115 and 315 above. The feedback portion $T_{FB}$ of the power switch 605 off ends when the current flowing in diode 630 falls to substantially zero value. The control circuit 615 is coupled to regulate a duty cycle of feedback portion $T_{FB}$ of the power switch off time as a proportion of the total power switch switching cycle period. In one example, the circuitry discussed with reference to FIG. 3A may be used to provide this operation.

Figure 7:
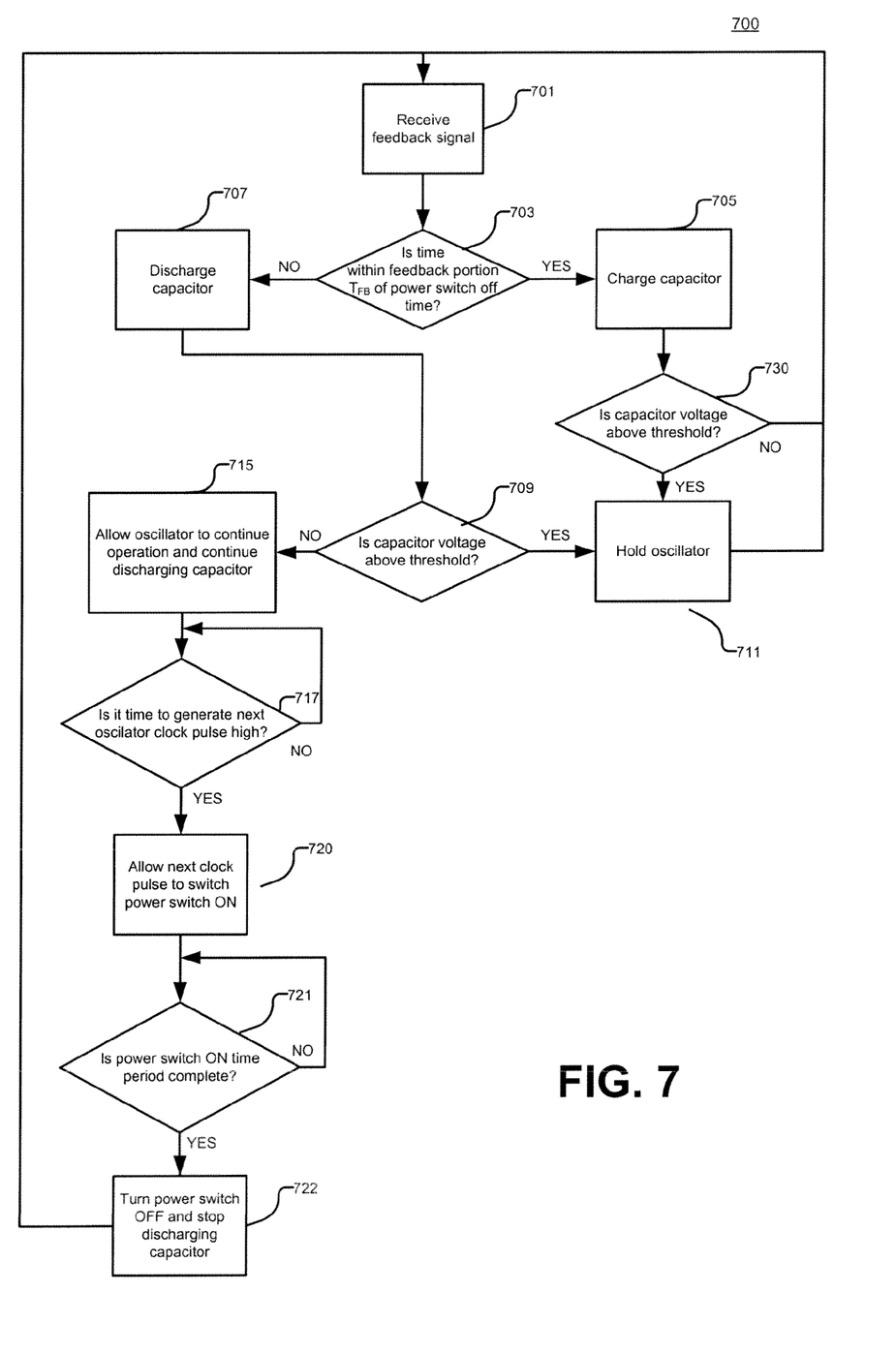
FIG. 7 is a flowchart illustrating an example method for regulating power delivered from an input of a power converter to an output of the power converter in accordance with the teachings of the present invention.

FIG. 7 shows generally a flowchart 700 describing one example method of regulating power delivered from an input of a power converter to an output of the power converter in accordance with the present invention. As shown in the example, the feedback signal is received in block 701. In block 703, it is determined if it is within the feedback portion $T_{FB}$ of the power switch 105 off time. If so, then the feedback capacitor 360 is charged with fixed current source 308 in block 705. In block 730 it is determined whether the voltage Va across the feedback capacitor 360 is above the threshold Vref1. If so, then the oscillator 333 is held from oscillating in block 711, and the feedback signal is again received in block 701. If the voltage Va across the feedback capacitor 360 is below the threshold Vref1, then the oscillator 333 is allowed to continue operation and the feedback signal is again received in block 701. If, in block 703 it is determined that the time is not within the feedback portion $T_{FB}$ of the power switch 105 off time, then the feedback capacitor 360 is discharged with fixed current source 307 in block 707. In block 709, it is determined whether the voltage Va across the feedback capacitor 360 is above the threshold Vref1. If so, then the oscillator 333 is held from oscillating in block 711, and the feedback signal is again received in block 701. If the voltage Va across the feedback capacitor 360 is below the threshold Vref1, then the oscillator 333 is allowed to continue operation in block 715 while the capacitor 360 continues to be discharged with fixed current source 307. It is understood that in line with the operation of the circuitry in FIG. 3A, capacitor 360 will only be discharged as long as the voltage across capacitor 360 is above lower threshold level Vref2 304. In block 717 it is determined whether it is now time to generate the next oscillator clock high signal pulse and when that time is reached, block 720 allows the next clock pulse high signal to switch the power switch ON in block 720. In block 721 it is determined whether the power switch ON time period is complete and in block 722, the power switch is turned off and discharging of the capacitor 360 is stopped although it is noted that if capacitor 360 voltage 320 had already reached Vref2 304 threshold voltage, then discharging of the capacitor 360 will have already stopped.

Using the example flowchart method of FIG. 7, therefore, the switching of the power switch can be controlled to regulate power delivered from the input to the output of the power converter in response to the duty cycle ratio of the feedback portion $T_{FB}$ of the power switch off time as a proportion of the total power switch switching cycle period in accordance with the teachings of the present invention.

In the above description of control circuit 315 an oscillator 333 period is responsive to a voltage across a capacitor 360 in FIG. 3A. It is noted however that in another example the oscillator period could alternatively be responsive to a value of a digital counter circuit while still benefiting from the teachings of the present invention. In one example a digital counter circuit could be incremented at a frequency higher than the power switch switching frequency, for the feedback portion of the off time of the power switch and decremented at a frequency higher than the power switch switching frequency, for the remaining portion of the power switch switching cycle period. The value of the digital counter count could then be compared to a threshold number and the oscillator be allowed to run while the counter count is below the threshold number and held when the counter count is above the threshold number. It is noted that other techniques could be used as alternatives to the above descriptions for controlling the oscillator period to regulate the feedback portion of the power switch off as a proportion of the power switch switching cycle period while still benefiting from the broader teachings of the present invention.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A control circuit for use in a power converter, comprising:
 a clock signal generator coupled to generate a clock signal to control switching of a power switch to be coupled to the control circuit;
 a feedback circuit coupled to receive a feedback signal which is representative of an output of a power converter during a feedback portion of an off time of the power switch, the feedback circuit coupled to respond to the feedback signal to control the clock signal generator to regulate a duty cycle of the feedback portion of the off time of the power switch as a proportion of a total power switch switching cycle period,
 wherein the feedback circuit further comprises a feedback capacitor coupled to be charged during the feedback portion of the off time of the power switch and coupled to be discharged for a remaining portion of the total power switch switching cycle period and comprises first and second current sources coupled to charge and discharge the feedback capacitor; and
 a voltage stabilization circuit coupled to the feedback circuit to stabilize first and second voltages across first and second current sources, respectively.

2. The control circuit of claim 1 wherein the clock signal generator comprises a comparator coupled to hold an oscillator from oscillating in response to the feedback circuit.

3. The control circuit of claim 1 wherein the feedback signal is a feedback voltage.

4. The control circuit of claim 1 wherein the feedback signal is a feedback current.

5. The control circuit of claim 1 wherein the clock signal generator regulates the duty cycle of the feedback portion of the off time of the power switch as the proportion of the total power switch switching cycle period when the duty cycle reaches a threshold value.

6. The control circuit of claim 1 wherein the clock signal generator regulates the duty cycle of the feedback portion of the off time of the power switch as the proportion of the power switch switching cycle period to be substantially constant.

7. A control circuit for use in a power converter, comprising:
 a clock signal generator coupled to generate a clock signal to control switching of a power switch to be coupled to the control circuit;

a feedback circuit coupled to receive a feedback signal which is representative of an output of a power converter during a feedback portion of an off time of the power switch, the feedback circuit coupled to respond to the feedback signal to control the clock signal generator to regulate a duty cycle of the feedback portion of the off time of the power switch as a proportion of a total power switch switching cycle period; and wherein the feedback circuit further comprises a feedback capacitor coupled to be charged during the feedback portion of the off time of the power switch and coupled to be discharged for a remaining portion of the total power switch switching cycle period.

8. The control circuit of claim 7 wherein the feedback circuit further comprises first and second current sources coupled to charge and discharge the feedback capacitor in response to the feedback signal.

9. The control circuit of claim 8 further comprising a voltage stabilization circuit coupled to the first and second current sources to stabilize first and second voltages across the first and second current sources, respectively.

10. The control circuit of claim 9 wherein the voltage stabilization circuit comprises an amplifier having an input coupled to the feedback capacitor, wherein the amplifier has an output that is coupled to either the first current source or the second current source in response to whether the feedback capacitor is coupled to be charged or discharged, respectively.

11. The control circuit of claim 7 wherein the clock signal generator comprises a comparator coupled to hold an oscillator from oscillating in response to the feedback circuit.

12. The control circuit of claim 7 wherein the feedback signal is a feedback voltage.

13. The control circuit of claim 7 wherein the feedback signal is a feedback current.

14. The control circuit of claim 7 wherein the clock signal generator regulates the duty cycle of the feedback portion of the off time of the power switch as the proportion of the total power switch switching cycle period when the duty cycle reaches a threshold value.

15. The control circuit of claim 7 wherein the clock signal generator regulates the duty cycle of the feedback portion of the off time of the power switch as the proportion of the power switch switching cycle period to be substantially constant.

* * * * *